United States Patent [19]

Sue

[11] Patent Number: 4,699,034

[45] Date of Patent: Oct. 13, 1987

[54] ROLL PAPER HANDLING APPARATUS

[75] Inventor: Takaji Sue, Atsugi, Japan

[73] Assignee: Ricoh Company, Ltd., Tokyo, Japan

[21] Appl. No.: 586,023

[22] Filed: Mar. 5, 1984

[30] Foreign Application Priority Data

Mar. 4, 1983 [JP] Japan .................................. 58-35349
Mar. 18, 1983 [JP] Japan .................................. 58-45696
Mar. 23, 1983 [JP] Japan ............................ 58-41694[U]

[51] Int. Cl.⁴ ...................... B65H 35/04; B65H 19/12
[52] U.S. Cl. ........................................ 83/649; 242/55;
242/55.53; 355/13
[58] Field of Search .................... 355/13; 242/156, 75;
83/649

[56] References Cited

U.S. PATENT DOCUMENTS

3,292,471 12/1966 Sames et al. ...................... 83/649 X
3,350,031 10/1967 Ireland ............................... 242/156.2
3,815,990 6/1974 Newcomb et al. .................... 355/13
3,830,124 8/1974 Ravera et al. ...................... 83/649 X Primary Examiner—Donald R. Schran
Attorney, Agent, or Firm—Oblon, Fisher, Spivak, McClelland & Maier

[57] ABSTRACT

A roll paper handling device for use in various recording machines, such as facsimiles and copiers, which employ recording paper in the form of a roll is provided. The present device includes a box in which a roll of paper may be rotatably installed in position which may be moved between an operative position where a lead out paper portion unrolled from the roll may be fed to a desired location and an inoperative position where the roll of paper may be replaced and a locking mechanism which allows the box to be moved to the inoperative position only when said lead out paper portion has been completely pulled back into the box. The locking mechanism is also so structured so as to apply a back tension to the roll of paper thereby allowing to prevent the roll of paper from rotating exceedingly.

14 Claims, 12 Drawing Figures

ROLL PAPER HANDLING APPARATUS

BACKGROUND OF THE INVENTION

1. Field of the Invention

This invention generally relates to apparatus for handling roll paper, which is continuously long paper wound in the form of a roll, and particularly a roll paper handling structure which may be advantageously used in various types of recording machines, such as facsimile machines and copiers, which use recording paper in the form of a roll.

2. Description of the Prior Art

Many recording machines, such as facsimiles and copiers, use recording paper in the form of a roll instead of cut sheets. In such recording machines, the recording paper is unwound from the roll and after having recorded desired information, is severed to a desired size. When the remaining amount of roll paper becomes scarce, it must be replaced with a new roll. And, in order to facilitate such a replacement operation, it has been proposed to use an installation box which is structured to receive therein roll paper and which may be pulled out of the machine, However, since the leading portion of the paper unwound from the roll received in the box is normally located in a paper passage, which includes a recording seciton, where a recording element, such as a thermal printhead, is provided, and which is defined, for example, by rollers and guide plates outside of the box. Thus, if the installation box is drawn out with the leading portion of the roll paper located in the paper passage, the paper will be torn undesirably. This is disadvantageous because the torn paper might block the paper passage, thereby necessitating to remove the torn paper and possibly readjustments.

Moreover, the roll paper is normally supported rotatably in the installation box and in order to make a paper feeding operation as smooth as possible as unwound from the roll, it is desired to support the roll paper rotatably as smoothly as possible. However, the roll paper is normally rotated intermittently because it must be cut to sizes after recording. Thus, the roll will be excessively rotated if the roll is supported to be freely rotatable. In order to prevent the roll from rotating excessively during its intermittent rotating operation, it has been proposed to apply so-called back tension to the roll thereby applying a force which tends to resist the roll from rotating in the unwinding direction. However, the prior art structure for applying such back tension was relatively bulky and complicated, and furthermore, in the prior art structure it was not easy to maintain the level of back tension constant.

SUMMARY OF THE INVENTION

It is therefore a primary object of the present invention to provide an improved roll paper handling apparatus.

Another object of the present invention is to provide an improved roll paper handling apparatus enabling to carry out a roll paper replacement operation.

A further object of the present invention is to provide an improved roll paper handling apparatus capable of maintaining the level of back tension constant at all times.

A still further object of the present invention is to provide a roll paper handling structure which is suited to be integrated into various types of recording machines, such as facsimiles and copiers, employing recording paper in the form of a roll.

A still further object of the present invention is to provide a roll paper handling apparatus which is simple in structure and reliable in operation.

A still further object of the present invention is to provide a roll paper handling structure which insures that the leading portion of the paper is properly pulled back into the installation box before the box is drawn out thereby allowing to prevent the paper from being cut undesirably.

Other objects, advantages and novel features of the present invention will become apparent from the following detailed description of the invention when considered in conjunction with the accompanying drawings.

DESCRIPTION OF THE PREFERRED EMBODIMENTS

Figure 1:
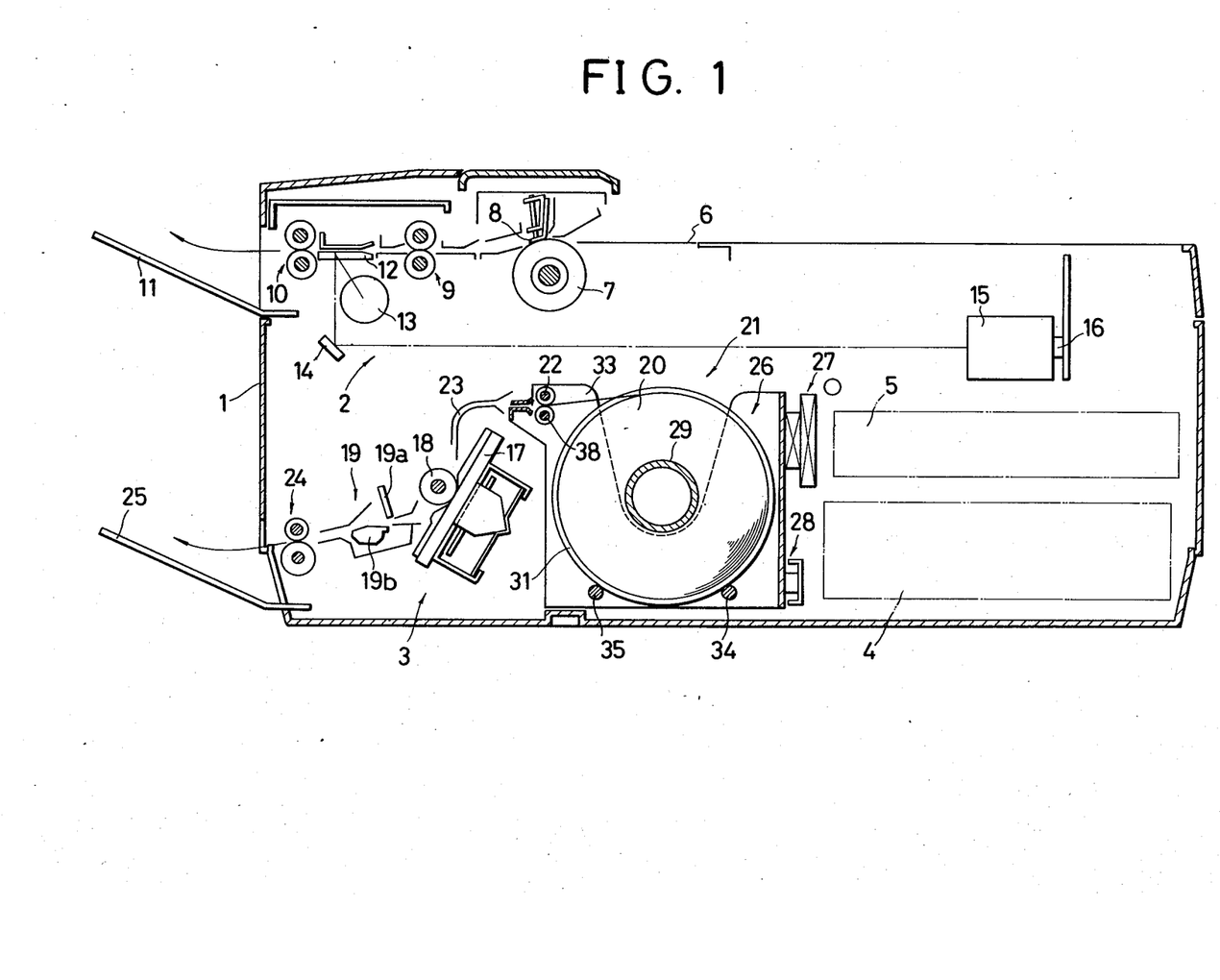
FIG. 1 is a schematic illustration showing the overall structure of a facsimile machine to which a roll paper handling structure constructed in accordance with the present invention has been applied.

Referring now to FIG. 1, there is shown a desk-top facsimile machine including a roll paper handling structure constructed in accordance with one embodiment of the present invention. Within a housing 1 is disposed a scanner unit 2 at its top and a plotter unit 3 is provided at bottom left of the housing 1 in FIG. 1. Also disposed are an electrical processing unit 5 and a power supply unit 4 at bottom right in the housing 1 of FIG. 1. The scanner unit 2 includes an original table 6 on which a stack of originals to be read is placed, a separating roller 7, a separating plate 8 in association with the roller 7 to separate and feed the originals one by one, a contact glass 12 where scanning of an original is carried out while the originals are transported one by one, transport rollers 9 and 10 which are disposed in front and rear of the contact glass 12, and a tray 11 disposed downstream of the rollers 10 for receiving the originals which have been scanned.

While an original moves past the contact glass 12, it is illuminated by an illumination lamp 13 and a light image from the original is reflected by a mirror 14 to be directed into a photoelectric converting device 16 through a lens unit 15, where the light original image is converted into an electrical image signal. The plotter unit 3 includes a thermal printhead 17, which is well known in the art, a platen roller 18, which causes thermally sensitive paper to be pressed against the printhead 17 and a cutter 19 for cutting the paper into desired sizes after recording.

Thermally sensitive recording paper 20 in the form of a roll (hereinafter, also simply referred to as roll paper) is rotatably stored in a roll paper storing device 21 which also includes a manually operable roller 22. A paper guide 23 is disposed as interposed between the roll paper storing device 21 and the printhead 17 so that the recording paper 20 lead out of the storing section 21 is transported to the printhead 17 as guided by the paper guide 23. As briefly mentioned before, the recording paper 20 is transported as pressed against the printhead 17 by means of the platen roller 18. The recording paper 20 is then cut to a desired size by a cutter 19 including a stationary cutter blade 19a and a movable cutter blade 19b, and the recording paper thus cut is discharged onto the tray 25 by means of a pair of discharging rollers 24.

The roll paper storing device 21 includes a roll paper installation box 26 which is provided to be slidably movable along fuide rails 27 and 28 fixedly mounted on a stationary and immovable member 53 (see FIG. 3) so that the installation box 26 may be moved out of the housing 1 as slided along the rails 27 and 28. In the following description, a position where the installation box 26 may be located inside of the housing 1 for supplying the roll paper 20 to a recording section including the printhead 17 will be referred to as an operating position or set position and a position where the installation box 26 may be located outside of the housing 1 as slid along the rails 27 and 28 for replacement with a new roll paper will be referred to as an inoperative position or drawn position.

Figure 2:
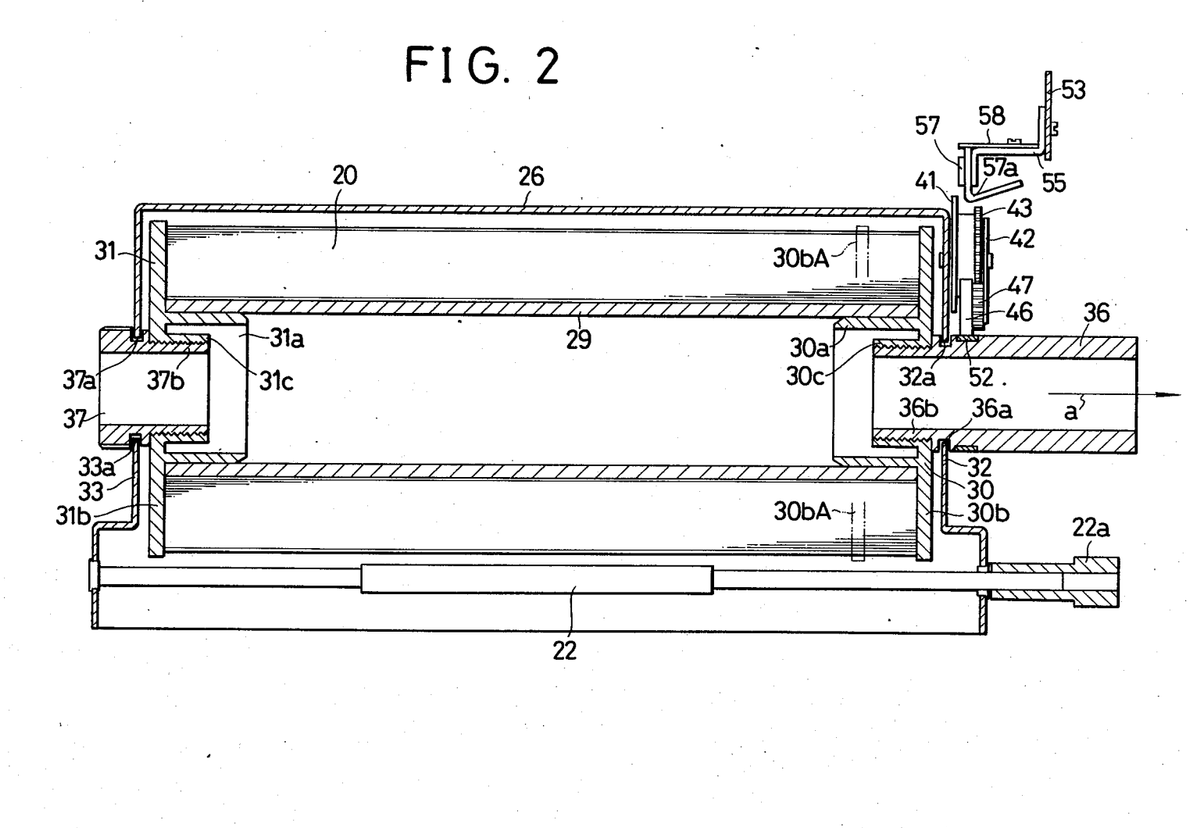
FIG. 2 is a plan view in cross section showing the roll paper handling structure embodied into the facsimile machine shown in FIG. 1.
Figure 8:
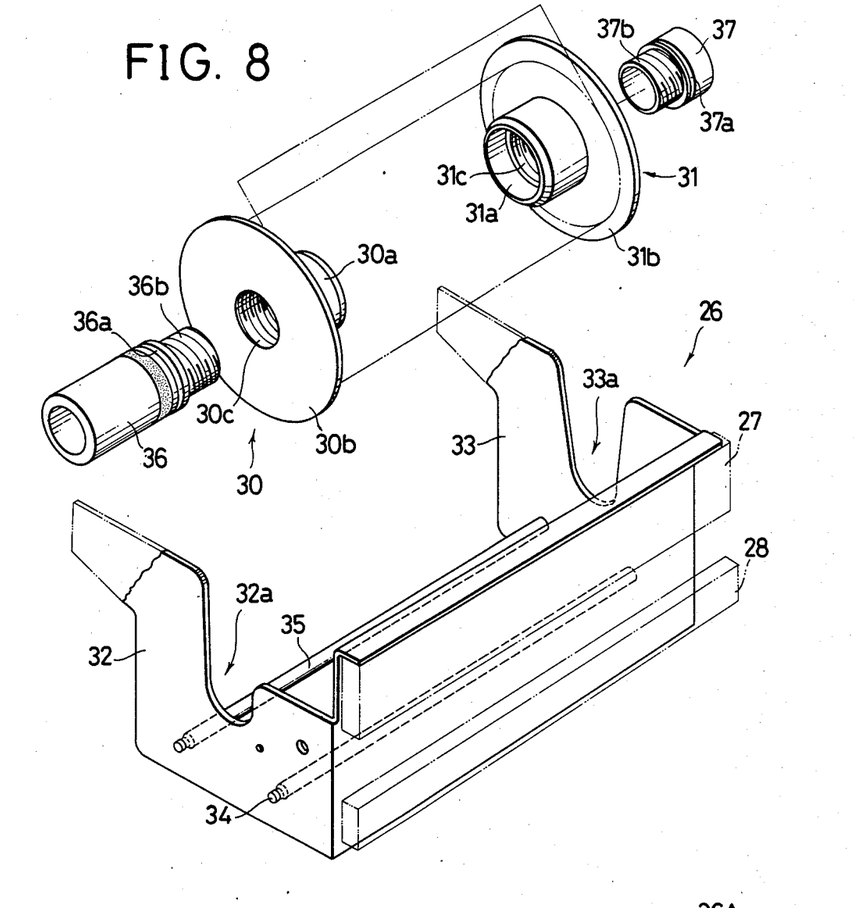
FIG. 8 is an exploded, perspective view showing in detail how a roll paper is rotatably stored in the intallation box of the present roll paper handling structure.

As shown in FIGS. 1 and 2, the roll paper 20 is wound around a paper tube 29 in the form of a roll and it is shipped from a supplier normally in this manner. As shown in FIG. 2, a pair of spools 30 and 31 are provided with their tubular portions 30a and 31a fitted into the paper tube 29 on both ends. As also shown in FIG. 8, the spools 30 and 31 include flange portions 30b and 31b which are larger in diameter than the outer diameter of the roll paper 20 in its initial state before use and tubular portions 30a and 31a which may be snugly fitted into the paper tube 29, respectively. The spools 30 and 31 also include inner tubular portions 30c and 31c, respectively, each of which is provided with a female thread at the inner peripheral surface thereof.

Figure 4:
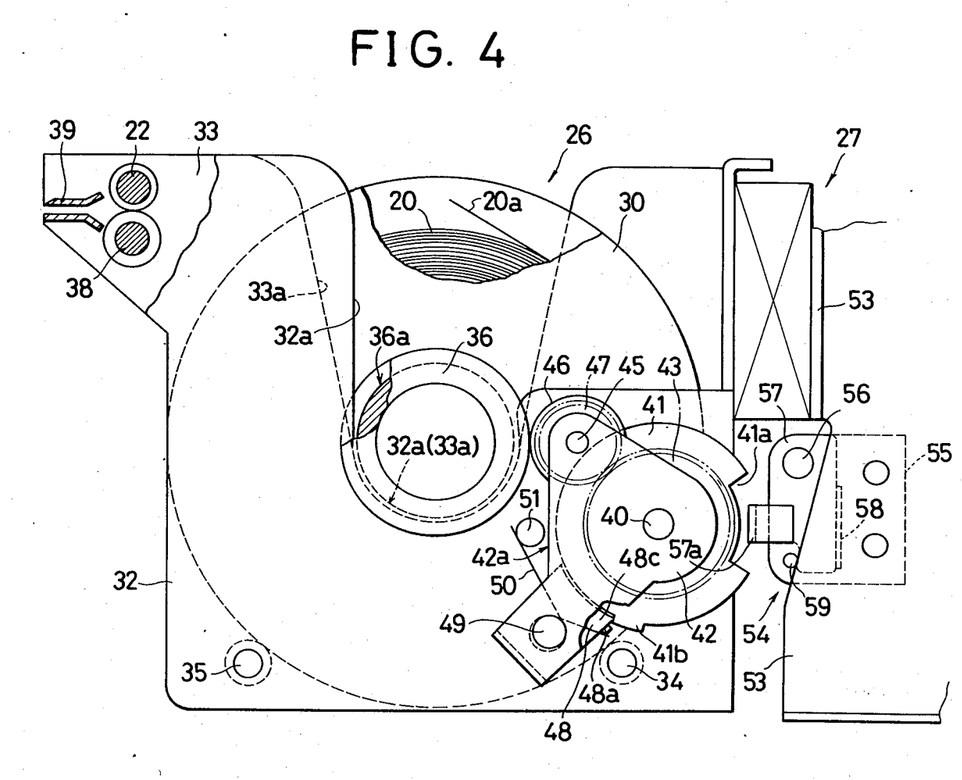
FIG. 4 is another partly cut-away front view showing the roll paper handling structure of FIG. 3 when the structure is in an unlocked condition.

As shown in FIGS. 1 and 4, the roll paper storing device 21 includes a front plate 32 and a rear plate 33. Rotatably provided is a pair of roll paper supporting shafts 34 and 35 as extending between the front and rear plates 32 and 33 as spaced apart from each other over a predetermined distance generally at the bottom of the installation box 26 such that the spools 30 and 31 may rest on the supporting shafts 34 and 35 in rolling contact therewith when the roll paper 20 is placed in position. Thus, when the roll paper 20 is placed in position in the installation box 26, it is held rotatably.

The right side spool 30 in FIG. 2 is fixedly provided with a knob or right positioning shaft 36 with its end threaded portion 36b screwed into the inner tubular portion 30c. The knob 36 is also provided with a circumferential positioning groove 36a which may be used to keep the roll paper 20 in position with respect to its longitudinal direction. The other or left side spool 31 is also fixedly provided with a left side positioning shaft 37 with its end threaded portion 37b tightly screwed into the inner threaded tubular portion 31c. The positioning shaft 37 is also provided with a circumferential groove 37a which may be used for positioning as will be described in greater detail hereinbelow. The front and rear plates 32 and 33 are provided with recesses 32a and 33a each generally in the form of a valley, and the bottom of each of the valley-shaped recesses 32a and 33a is engageable with the corresponding positioning groove 36a or 37a. Thus, when the roll paper 20 is placed in position inside the installation box 26, the positioning grooves 36a and 37a are brought into engagement with the corresponding valley-shaped recesses 32a and 33a so that the axial movement of the roll paper 20 is limited. Thus, the positioning grooves 36a and 37a are formed to be slightly wider than the corresponding plates 32 and 33 which are provided with the valley-shaped recesses 32a and 33a, respectively. Thus, the engagement between the grooves 36a and 37a and the recesses 32a and 33a is relatively loose. As best shown in FIG. 4, when the roll paper 20 is placed in position inside the installation box 26, the positioning grooves 36a and 37a are only engageable with the corresponding valley-shaped recesses 32a and 33a axially and not longitudinally, It is to be noted that for placement or removal of the roll paper 20 into or from the installation box 26, it is convenient to provide both of the positioning shafts 36 and 37; however, in order to keep the roll paper 20 in position for its rotation around its longitudinal axis, provision of simply the knob 36 will do.

The manually operable feed roller 22 is rotatably provided as extending between the front and rear plates 32 and 33 at top right of the installation box in FIG. 1, and a knob 22a, which may be grabbed by an operator, is fixedly attached at one end thereof (see FIG. 2). Also rotatably provided is a follower roller 38 in pressure contact with the feed roller 22 so that the leading portion unwound from the roll 20 may be pinched between the rollers 22 and 38 thereby allowing to unwound the roll 20 by causing the roller 22 to rotate manually. Furthermore, a manually operable cutter 39 is disposed to the left of the rollers 23 and 38 so that the recording paper may be cut manually by operating the cutter 39.

Figure 5:
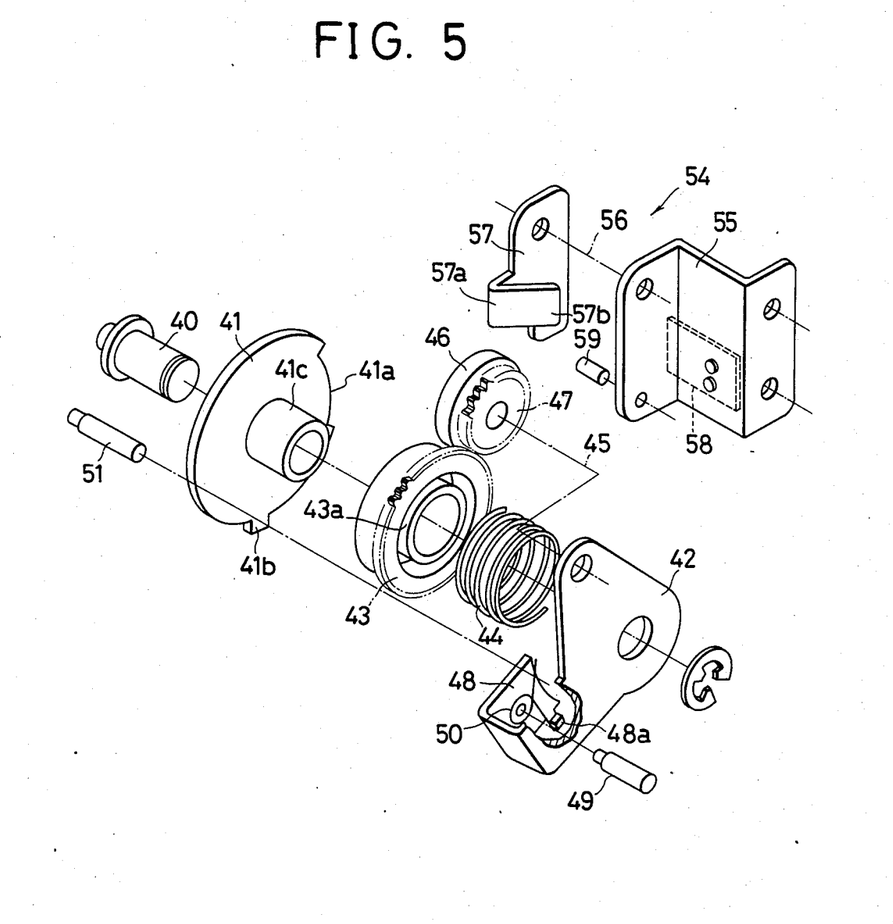
FIG. 5 is an exploded, perspective view showing a main portion of the roll paper handling structure shown in FIGS. 3 and 4.

In the front plate 32 of the installation box 26 is fixedly planted a supporting pin 40 which rotatably supports a control disk 41 as loosely fitted into a tubular portion 41c, which is fixedly attached to the control disk 41, and also a bracket 42 at the top end. The control disk 41 is provided with a cut-away portion 41a and a projection 41b along its periphery at predetermined respective positions. A gear 43 formed with an annular groove 43a is rotatably fitted onto the tubular portion 41c of the control disk 41. A coil spring 44 is also provided between the gear 43 and the bracket 42 as inserted in the annular groove 43a so that the gear 43 is pressed against the end surface of the control disk 41.

Another supporting pin 45 is fixedly planted in the bracket 42, and a roller 46 which is integrally structured with a gear 47 is rotatably supported as fitted onto the pin 45, with the gear 47 being in mesh with the gear 43. The brakcet 42 is partly bent to form a stopper section 48, which extends beyond and in the vicinity of the periphery of the control disk 41 such that it may come into engagement with the projection 41b. In the stopper section 48 is fixedly planted a pin 49 around which a torsion spring 50 is wound. One end of the spring 50 is in engagement with an engaging portion 48a of the stopper section 48 with the other end engaged with a pin 51 fixedly planted in the front plate 32. This torsion spring 50 applies a biasing force to the bracket 42 such that the roller 46 rotatably supported on the bracket 42 is pressed against the knob 36. As best shown in FIG. 2, that portion of the knob 36 which comes into contact with the roller 46 is fixedly provided with a rubber ring 52 so as to increase the rotating power transmitting capability between the knob 36 and the roller 46.

The stationary front plate 53 is provided with a lock mechanism 54 as shown in FIGS. 2 and 4. The lock mechanism 54 includes a bracket 55 fixedly mounted on the front plate 53, a stopper 57 having a bent portion 57a and pivotally supported by the bracket 55 by means of a pin 56, a leaf spring 58 having its one end fixedly attached to the bracket 55 to apply a pivotal biasing force to the stopper 57 and a pin 59 planted in the bracket 55 for limiting the pivotal motion of the stopper 57. The stopper 57 is so located by the leaf spring 58 to have its bent portion 57a positioned to be engageable with the control disk 41. That is, as shown in FIG. 2, when the installation box 26 is located at the operative or set position, the stopper 57 takes the position to the right of the control disk 41. As will be described later in detail, if one tries to pull the installation box 26 out in the direction indicated by the arrow as in FIG. 2 under the condition that the cut-away portion 41a of the control disk 41 is not in registry with the stopper 57, the installation box 26 will not be drawn out because the control disk 41 will come into engagement with the stopper 57. On the other hand, if the cut-away portion 41a of the control disk 41 is in registry with the stopper 57 as shown in FIG. 4, the installation box 26 may be pulled out of the housing 1 to the inoperative position.

Now, description will be made as to the operation of the above-described structure. First, a description will be made as to the case where the installation box 26 is to be pulled out of the housing 1.

Figure 3:
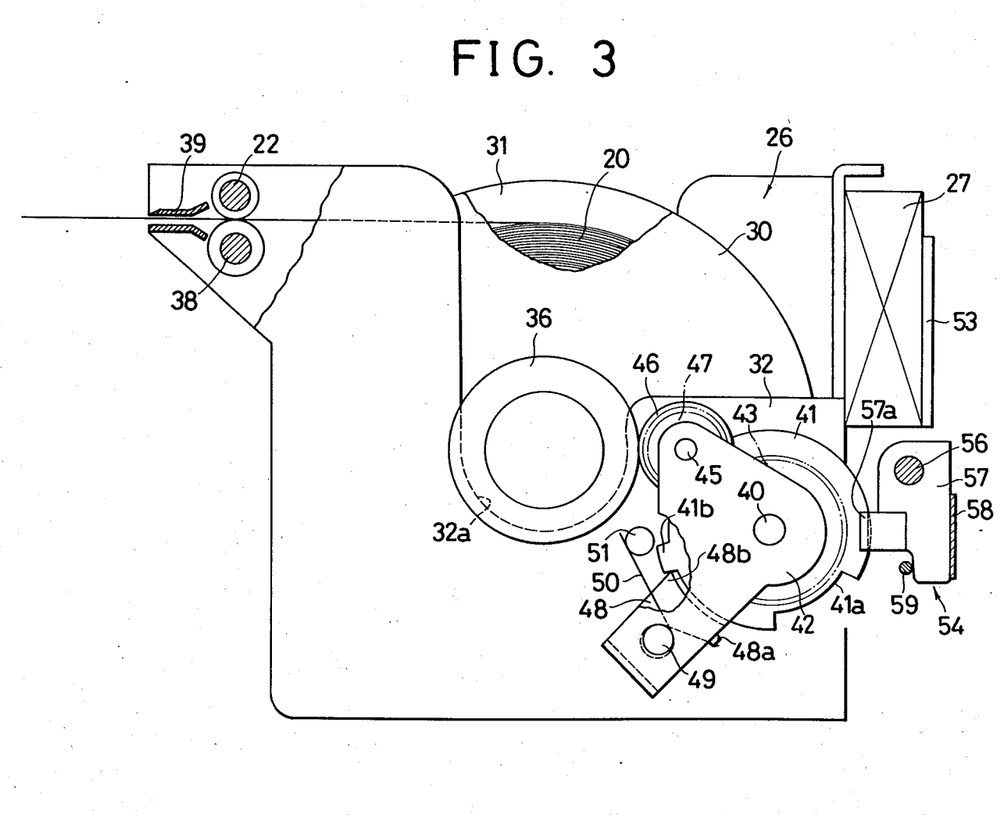
FIG. 3 is a partly cut-away front view showing the roll paper handling structure embodied into the facsimile machine shown in FIG. 1 when the structure is in a locked condition.

When it is desired to pull the installation box 26 out of the housing 1 after using the roll paper 20 for a while, the leading portion unwound from the roll 20 is normally placed between the thermal printhead 17 and the platne roller 18 in FIG. 1. Under the circumstances, the disk 41 takes the position as indicated in FIG. 3 wherein the projection 41b of the control disk 41 is in a locked position in which the projection 41b is in engagement with one side 48b of the stopper 48. In such a locked state, the control disk 41 has its cut-away portion 41a located out of registry with the stopper 57 so that the control disk 41 may come into engagement with the stopper 57. Accordingly, with the installation box 26 located at the operative position and the control disk 41 in the locked position, the installation box 26 cannot be pulled out of the housing 1.

Under the condition, when the knob 36 is turned clockwise as viewing into FIG. 3, the roller 46 is caused to rotate counterclockwise in association therewith. Rotation of the roller 46 is transmitted to the gear 43 via the gear 47. The rotation of the gear 43 is transmitted to the control disk 41 through a frictional coupling between the control disk 41 and the gear 43 through the coil spring 44 so that the control disk 41 is deiven to rotate clockwise. Then, when the control disk 41 has been rotated until the projection 41b comes into engagement with the other side 48c of the stopper 48 as shown in FIG. 4, the cut-away portion 41a comes to be in registry with the bent portion 57a of the stopper 57, so that the control disk 41 is now in an unlocked position. The amount of rotation of the knob 36 when the control disk 41 has been rotated from the locked position to the unlocked positin is determined such that the leading portion of the roll 20 may be completely wound into the installation box 26. More particularly, since the length of paper which is wound into the roll 20 changes depending upon the diameter of the roll 20, the gear ratio between the gears 46 and 47 is determined such that the leading out portion may be completely wound into the installation box 26 when the control disk 41 has been rotated from the locked position to the unlocked position for the roll 20 having a minimum diameter. It is to be noted that even after the control disk 41 has been brought into the unlocked position, the knob 36 may be rotated further through the frictional coupling between the control disk 41 and the gear 43.

As shown in FIG. 4, when the control disk 41 has been brought into the unlocked position to have the roll 20 completely located within the installation box 26, the box 26 may now be pulled out of the housing 1 as slid along the guide rails 27 and 29. The installation box 26 may be completely removed from the guide rails 27 and 28 by pulling the box 26 beyond the inoperative position as defined previously excessively toward the operator, if desired. With the installation box 26 located at the inoperative position, the roll 20 may be removed from the box 26 by grabbing the positioning shafts 36 and 37. When the roll 20 is removed from the box 26, the roller 46 becomes disengaged from the knob 36 and the bracket 42 is pivoted counterclockwise around the pin 40, but such a pivotal motion is limited by the engagement between one side 42a of the backet 42 and the pin 51.

Figure 7:
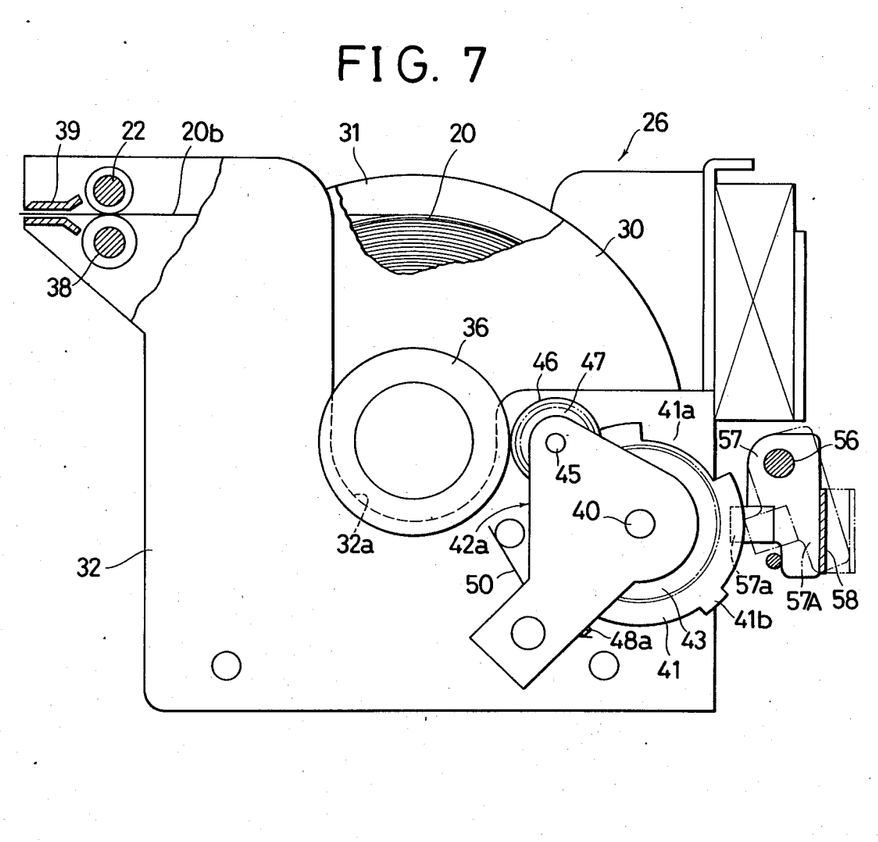
FIG. 7 is a further partly cut-away, front view showing the roll paper handling structure indicating the condition in which the installation box housing therein a new roll paper is about to be pushed into its operating position.

Then, a new roll of paper is loaded into the installation box 26. At this time, the spools 30 and 31 are placed on the supporting shafts 34 and 35 with the positioning grooves 36a and 37a being brought into engagement with the valley-shaped recesses 32a and 33a, respectively, thereby placing the new roll 20 in position inside of the installation box 26 as rotatably as well as limited in axial movement. When the roll paper 20 is loaded into the installation box 26, the roller 46 comes into contact with the outer peripheral surface of the knob 36 under pressure by means of the torsion spring 50. Thereafter, as shown in FIG. 7, a leading end 20b of the roll paper 20 is fed between the rollers 22 and 38 by manually rotating the roller 22 and the cutter 39 is operated to cut off any unnecessary portion. As the leading end is fed by rotating the roller 22, the roll 20 rotates, which then causes the knob 36 to rotate, which, in turn, causes the roller 46 to rotate clockwise in association therewith. Thus, the control disk 41 is also caused to rotate counterclockwise from the unlocked position (FIG. 4) to the locked position, as shown in FIG. 7.

Figure 6:
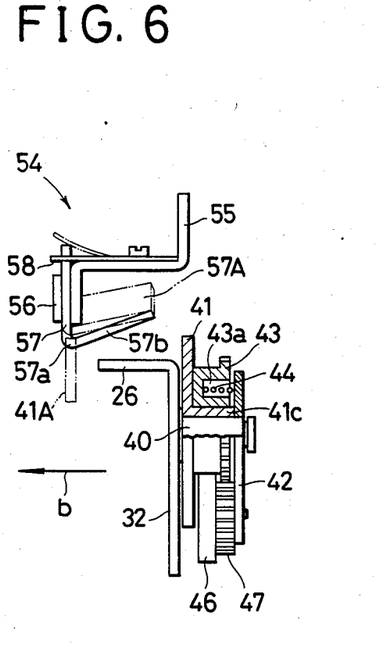
FIG. 6 is a schematic illustration which is useful for explaining the operation of the lock mechanism provided in the roll paper handling structure.

The relative positional relation between the control disk 41 and the stopper 57 under the condition is shown by the solid lines in FIG. 6. With the control disk 41 at the locked position, when the installation box 26 is pushed into the housing 1 toward its operative position as indicate by the arrow b, a non-cut-away peripheral portion of the control disk 41 comes into contact with an inclined surface 57b of the bent portion 57a of the stopper 57. When the installation box 26 is pushed further into the housing 1, the control disk 41 cuases the stopper 57 to pivot around the pin 56 against the force of the leaf spring 58, as indicated by the two-dotted line in FIGS. 6 and 7, so that the stopper 57 is moved out of a path of travel for the installation box 26. As the installation box 26 is pushed further, the control disk 41 at a position indicated by 41A becomes disengaged from the stopper 57 at a position indicated by 57A so that the stopper 57A returns to its original position indicated by reference number 57 due to the recovery force of the leaf spring 58. The relative positional relation between the stopper 57 and the roll paper installation box 26 (disk 41) is illustrated in FIG. 2, and, under the illustrated condition, the installation box 26 cannot be pulled out toward the direction indicated by the arrow a. That is, the installation box 26 comes to be located at the locked position simply by pushing it into the housing 1.

Thereafter, upon initiation of printing operation, the roll paper 20 is rotated counterclockwise in FIG. 7 together with the knob 36. Rotation of the knob 36 is transmitted to the control disk 41 via the roller 46, gear 47, gear 43 and spring 44 so that the control disk 41 is rotated counterclockwise in FIG. 7. This rotation of the control disk 41 comes to be limited when the projection 41b comes into engagement with the side 48b of the stopper 48, as shown in FIG. 3. Even if the control disk 41 becomes restrained in rotation in this manner, the roll 20 continues to rotate, but this rotation is not transmitted to the control disk 41 because of a sliding motion between the opposed end surfaces of the gear 43 and the control disk 41, which are in sliding contact. In other words, the roll 20 receives a frictional force from the control disk 41, which is now held stationarily, through the knob 36, roller 46, gear 47, gear 43 and spring 44. In the case of a paper transporting mechanism in a facsimile machine, use is commonly made of an intermittent driving source such as a stepping motor. Thus, the roll of paper when loaded in such a facsimile machine is repetitively and alternately subjected to rotation and stoppage. When the roll 20 of the paper is driven to rotate intermittently in this manner, the roll 20 tends to overrotate due to inertia. However, since a frictional force may be applied to the roll 20 of paper from the control disk 41, which is currently held stationary, this constitutes a resistive force to prevent the roll 20 of paper from rotating excessively. Thus, a proper back tension may be applied securely to the roll 20 of paper when needed.

Figure 9:
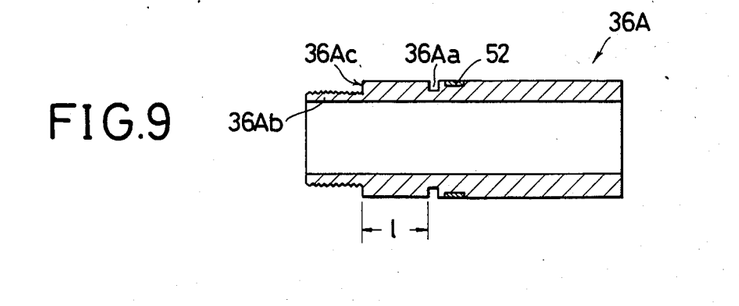
FIG. 9 is a longitudinal, cross-sectional view showing another positioning shaft which may be used to hold and position a roll paper having a shorter width.

Referring again to FIG. 2, the roll 20 of paper has a width, e.g., B4 size, which extends the full width of the roll paper installation box 26. If it is desired to use recording paper having a narrower width, e.g., A4, the knob 36 must be replaced with another knob 36A shown in FIG. 9. The only structural difference from the knob 36 resides in that a distance 1 between a positioning groove 36Aa and a step 36Ac is larger. The step 36Ac is a portion which comes into abutment against the outer end surface of the spool 30. The position of the flange portion of spool 30 when a roll of paper having A4 size with the knob 36A attached is loaded into the installation box 26 is indicated by 30bA in FIG. 2.

Figure 10:
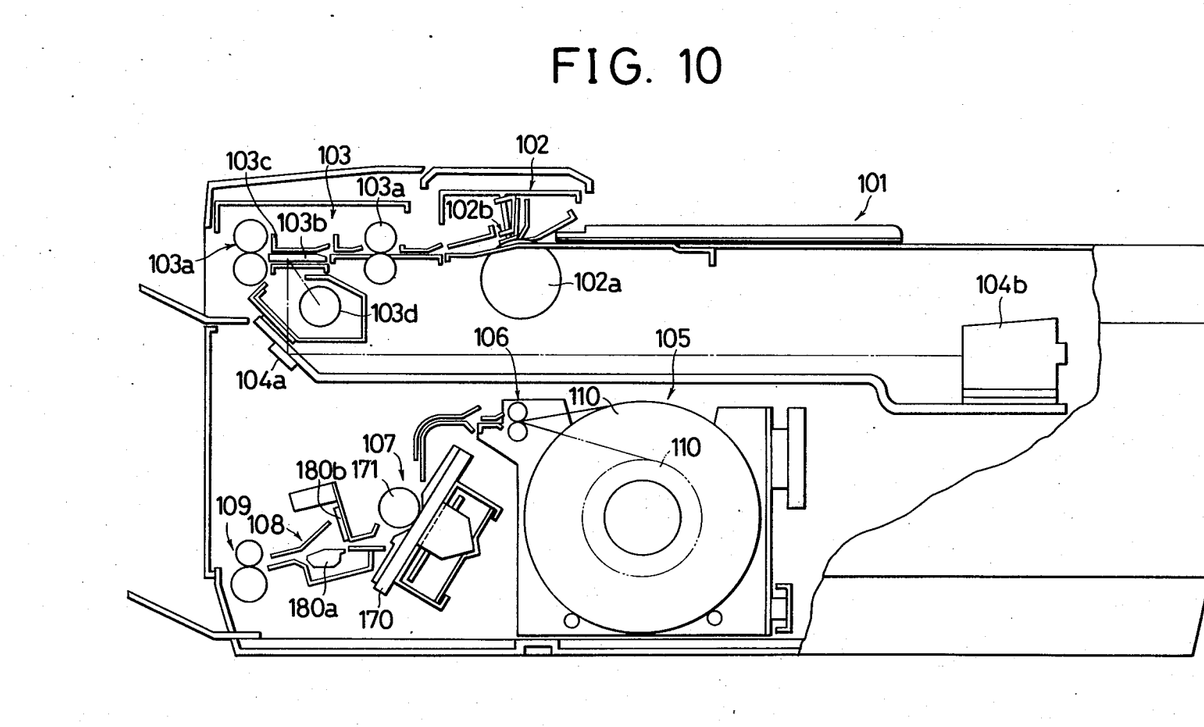
FIG. 10 is a schematic illustration showing the overall structure of another embodiment of the present invention which is also applied to a facsimile machine.

FIG. 10 shows the overall structure of a desk-top type facsimile machine to which the roll paper handling structure constructed in accordance with another embodiment of the present invention has been applied. As shown, the facsimile machine includes an original table 101 on which a stack of originals may be placed, an original separating section 102, an original scanning section 103, a photoelectric converting section 104, a roll paper storing section 105, a paper feeding section 106, an image forming section 107, a paper cutting section 108 and a recoridng paper discharging section 109. The original separating section 102 is provided adjacent to the original table 101 and includes a separating roller 102a and a friction plate 102b, which are disposed on both sides of a paper transporting path, thereby preventing multiple originals from being transported at the same time.

The original scanning section 103 includes two pairs of feed rollers 103a, 103a, the rollers of each pair of which are disposed in contact on both sides of the paper transporting path, a contact glass 103a which are diposed along the paper transporting path as interposed between the two pairs of feed rollers 103a, 103a, a reflector member 103c provided at the backside of the contact glass 103b, and an original illumination light source 103d disposed below the contact glass 103b to irradiate an original moving along the contact glass 103b. With such a structure, while an original is being transported by the feed rollers 103a, the original is irradiated by the light source 103d and the light reflecting from the original is directed into the photoelectric section 104. The photoelectric section 104 includes a reflecting mirror 104a disposed below the original scanning section 103 to receive the reflected light and a light-receiving sensor 104b, which is integral with a lens unit. Thus, the reflecting light from the original is lead into the photoelectric sensor 104b thereby converting it into an electrical signal.

On the other hand, the roll paper storing section 105 and the paper feeding section 106, which will be described in detail later, are provided in the same housing, and the roll paper storing section 105 stores a roll 110 of paper such that it may be unrolled from its top. The paper feeding section 106 is so structured to eliminate disadvantages which could be brought about due to inertia of roll 110 during operation and to cut off an unnecessary portion of paper unrolled from the roll 110 at the time of loading the roll 110. The image forming section 107 includes a thermal printhead 170 of well known structure, which causes thermally sensitive recording paper unrolled from the roll 110 to be recorded by forming so-called "burn points", and a platen roller 171, which causes the thermally sensitive recording paper 110 to be pressed against the printhead 170 and which is driven to rotate by means of a stepping motor (not shown) to cause the recording paper 110 to be transported as pressed against the printhead 170.

The paper cutting section 108 includes a cutter 180 which is disposed adjacent to the image forming section 107 and which includes a movable blade 180a and a stationary blade 180b. On the other hand, the paper discharging section 109 includes a pair of rollers disposed in contact one on each side with respect to the transporting path of recording paper. Thus, the recording paper 110 after having been cut to a desired length at the paper cutting section 108 is discharged out of the housing by the paper discharging rollers 109.

Figures 11, 12:
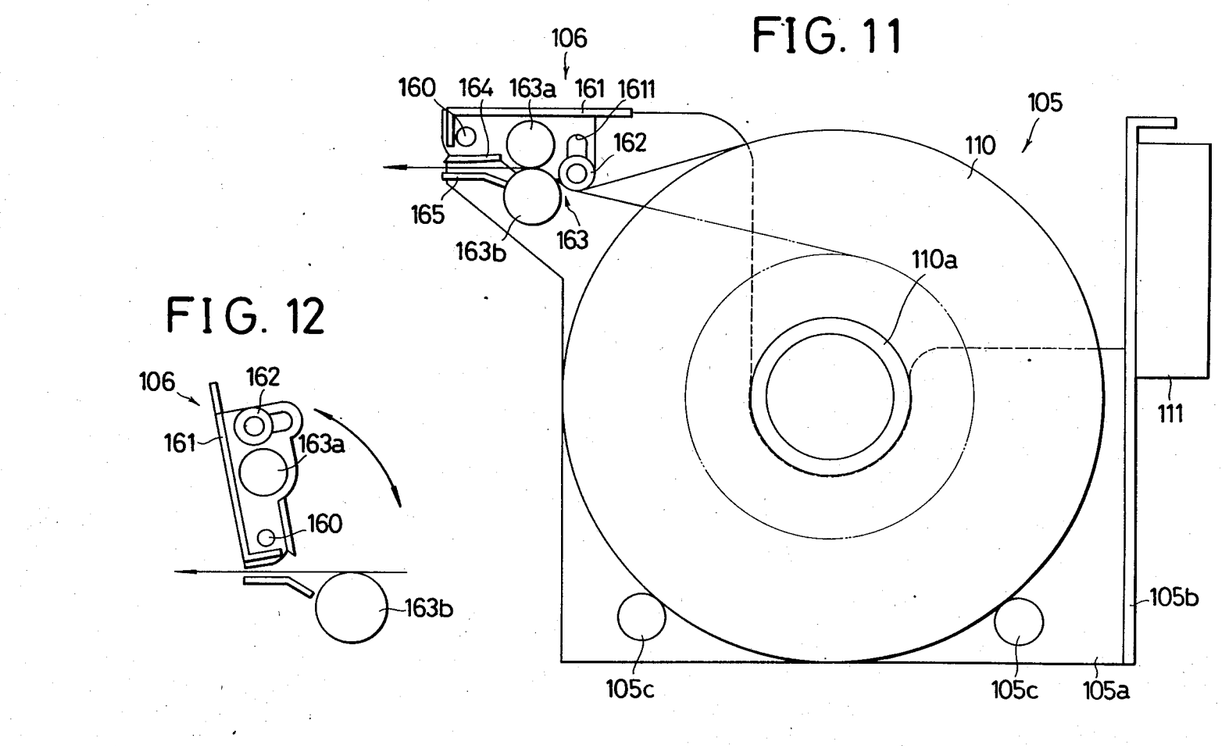
FIG. 11 is a schematic,f ront view of the roll paper handling structure of FIG. 10.
FIG. 12 is a schematic illustrating showing part of the structure shown in FIG. 11.

As shown in detail in FIG. 11, the roll paper storing section 105 and the paper feeding section 106 are provided in the same housing. similarly with the previously described embodiment, the roll paper storing section 105 includes a front plate 105a which rotatably supports a positioning shaft 110a of a spool which, in turn, is attached to one side of the roll 110 of paper. Although not shown specifically, it should be understood that a rear plate is also provided to rotatably support the positing shaft of another spool which is attached to the other side of roll 110. The roll paper storing section 105 also includes a side plate 105b which is fixedly provided with a track 111 which may be fitted into a guide rail provided in the main housing shown in FIG. 1. The roll paper storing section 105 is also provided with a pair of supporting shafts 105c, 105c as extending between the front and rear plates in parallel and spaced apart from each other at the bottom. Thus, the roll 110 of paper may be loaded as resting on the supporting shafts 105c, 105c to be unrolled from its top. In addition, the roll paper storing section 105 may be slidingly moved out of or into the main housing through a sliding connection between the track 111 and its associated guide rail provided in the main housing.

On the other hand, the paper feeding section 106 includes a pin 160 mounted on the front plate 105a at a position from where the recording paper unrolled from the roll 110, a bracket 161 which is pivotally supported by the pin 160, a stopper (not shown) engageable with the bracket 161 to have its free end located at a predetermined position, a tension roller 162 which is supported to be freely movably by the bracket 161 to apply a force to keep the recoridng paper in tension when set in position, feed rollers 163a and 163b, a manual cutter 164 and a guide plate 165. The bracket 161 is provided with a slot 1,611 extending vertically and the tension roller 162 is movably received in the slot 1,611 so that the tension roller 162 may move up and down freely by its own weight when the bracket 161 is set in position. Preferably, the weight of the tension roller 162 is set larger than a force required to unroll the roll 110 by rotating the roll 110, and, more in particular, it is set to be larger than a force required to have the leading end of the roll 110 having a maximum size right after loading lead out manually to be inserted between the feed rollers 163a and 163b. In addition, the weight of the tension roller 163 is also determined to be approximately equal to or smaller than the driving force applied to the recording paper by the platen roller 171 during facsimile operation.

The slot 1,611 formed in the bracket 161 has its bottom-most portion to locate the tension roller 162 such that an unrolling position on the roll 110 having a maximum diameter may be located to the side of the bracket 161 with respect to the vertical center line of the roll 110. Accordingly, the tension roller 162 may apply a maximum pressing force to the recording paper unrolled from the roll 110 having a maximum diameter. The upper feed roller 163a is rotatably supported by the bracket 161 and the bottom feed roller 163b is rotatably supported by the front plate 105a. In addition, the upper feed roller 163a may be moved away from the paper transporting path and thus from the bottom feed roller 163b with the bracket 161 pivoted counterclockwise. It should be understood that either one of these feed rollers 163a and 163b may be manually rotated to cause the leading end unrolled from the roll 110 to be transported toward the platen roller 71 in the image forming section 107.

The manual cutter 164 is fixedly provided at the exit end of the bracket 161 with respect to the paper transporting direction, and the cutter 164 has a blade which cuts the recording paper unrolled from the roll 110 when the bracket 161 is pivoted to the original position. The guide plate 165 is fixedly provided in the front plate 105a, and the cutter 164 comes to be located opposed to the guide plate 165 with a paper transporting path located therebetween.

For loading and unloading of the roll 110, the bracket 161 is pivoted. Assuming now that loading of a new roll is to be carried out, the roll paper storing section 105 must first be slidingly pulled out of the main housing through a sliding connection between the track 111 and its associated guide rail provided in the main housing, and then the bracket 161 is pivoted counterclockwise in FIG. 11 to have the paper transporting path exposed, as shown in FIG. 12. Under the condition, the roll paper 110 is loaded into the storing section 105 and its leading end is lead out from the roll 110 beyond the guide plate 165 of the paper feeding section 106. Then, when the bracket 161 is pivoted clockwise in FIG. 11 to its original position, the manual cutter 164 cuts the unnecessary portion of the paper and at the same time the upper and lower feed rollers 163a and 163b keep the leading out portion of the paper therebetween under pressure. Moreover, the tension roller 162 rides on the leading out portion of the paper to apply tension thereto. When the bracket 161 is pivoted clockwise back to its original position, the front edge of the lead out portion of the paper is set straight and perpendicular to the transporting direction of the paper.

Upon completing of loading the roll 110, the roll paper storing section 105 is pushed into the main housing to its operative position slidingly. Then one of the feed rollers 163a and 163b is manually rotated to advance the leading portion of the paper to be inserted between the platen roller 171 and the printhead 170. Under the condition, when an input signal is supplied to the thermal printhead 170, the platen roller 171 is intermittently driven so as to rotate to advance the paper as unrolled from the roll 110. During such an intermittent paper feeding operation by the platen roller 171, the tension roller 163 moves upward when the paper is advanced as unrolled from the roll 110, and it moves downward to keeep the paper under in tension upon termination of advancement of the paper, thereby preventing forming a slack portion in the paper unrolled from the roll 110.

While the above provide a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A roll paper handling device, comprising:
   holding means for holding a roll of paper removably and rotatably in position, said holding means being movable between a first paper feeding position and a second paper replacement position along a predetermined guide path; and locking means connected to said holding means for locking said holding means in said first position and unlocking said holding means in said second position, and means for automatically setting said holding means into said unlocked state when said roll of paper is rotated over a first predetermined angle and into said locked state when said roll of paper is rotated over a second predetermined angle wherein said locking means maintains said locked or unlocked state after having been rotated over said first or second predetermined angle while allowing said roll of paper to be rotated continuously.

2. A roll paper handling device of claim 1 wherein said holding means includes an installation box, positioning means for positioning said roll of paper in position in said box with respect to the axial direction of said roll and supporting means for rotatably supporting said roll of paper in said box.

3. A roll paper handling device of claim 2 wherein said installation box includes a front plate and a rear plate, each of which is provided with a generally valley-shaped recess, and said positioning means includes a pair of positioning shafts attached on both sides of said roll of paper, said pair of positioning shafts being each provided with a circumferential groove which may be engageable with the corresponding one of said valley-shaped recesses thereby limiting the axial movement of said roll of paper.

4. A roll paper handling device, comprising:
holding means for holding a roll of paper removably and rotatably in position, said holding means being movable between a first paper feeding position and a second paper replacement position along a predetermined guide path; and
locking means capable of taking a locked state in which said holding means is locked in said first position and an unlocked state in which said holding means may be moved from said first position to said second position along said guide path, said locking means being automatically set into said unlocked state when said roll of paper is rotated over a first predetermined angle and into said locked state when said roll of paper is rotated over a second predetermined angle and said locking means maintaining said locked or unlocked state after having been rotated over said first or second predtermined angle while allowing said roll of paper to be rotated continuously wherein said holding means includes an installation box, positioning means for positioning said roll of paper in position in said box with respect to the axial direction of said roll and supporting means for rotatably supporting said roll of paper in said box and wherein said installation box includes a front plate and a rear plate, each of which is provided with a generally valley-shaped recess, and said positioning means includes a pair of positioning shafts attached on both sides of said roll of paper, said pair of positioning shafts being each provided with a circumferential groove which may be engageable with the corresponding one of said valley-shaped recesses thereby limiting the axial movement of said roll of paper; and a paper tube around which said roll of paper is wound and a pair of spools, each including a tubular portion and a flange portion which are integrally formed, which are attached on both sides of said roll of paper with said tubular portions fitted into said paper tube, said spools resting on and being in rolling contact with said positioning shafts, said positioning shafts being fixedly attached to the corresponding spools.

5. A roll paper handling device of claim 4 wherein said locking means includes a pivotally supported bracket having a stopper portion, a control disk which has a cut-away portion and a projection engageable with said stopper portion and which is rotatably supported on said bracket, frictional coupling means which is coaxially and rotatably mounted on said bracket in a side-by-side relation with said control disk, an intermediate rotating member which is rotatably mounted on said bracket and in a rotating power transmission relation with said frictional coupling means, biasing means for normally urging said intermediate rotating member in rolling contact with one of said positioning shafts, and a one-way pivotal stopper member mounted on a stationary object along said guide pth, whre said cut-away portion is in registry with said one-way stopper member only when said unlocked state is established.

6. A roll paper handling device of claim 5 wherein said frictional coupling means includes a first gear which is provided with an annular groove and rotatably and coaxially mounted on said bracket and a coil spring fitted in said annular groove such that said control disk rotates against a friction between opposed end surfaces of said control disk and said first gear under the force of said coil spring.

7. A roll paper handling device of claim 6 wherein said intermediate rotating member includes a second gear which is in mesh with said first gear and a roller whose outer peripheral surface may be brought into rolling contact with an outer peripheral surface of said one of said positioning shafts.

8. A roll paper handling device of claim 7 wherein that portion of said outer peripheral surface of said one of said positioning shafts which is contacted by said roller is provided with a frictional member having a high frictional coefficient.

9. A roll paper handling device of claim 8 wherein said frictional member is a rubber ring.

10. A roll paper handling device of claim 1 wherein said first position is an operative position where paper unrolled from said roll of paper may be fed to a desired position and said second position is an inoperative position where replacement of said roll of paper may be carried out.

11. A roll paper handling device of claim 10 wherein said holding means includes feeding means to which said paper unrolled from said roll of paper is fed as said roll of paper unrolls.

12. A roll paper handling device of claim 11 wherein said feeding means includes a pivotally supported bracket which may be pivoted between an open position and a closed position, a first feed roller rotatably supported on said bracket and a second feed roller rotatably supported on said holding means whereby said first and second feed rollers are brought into a rolling contact when said bracket is set in said closed position and separated away from each other when said bracket is set is said open position.

13. A roll paper handling device of claim 12 wherein said bracket is provided with an elongated slot and said feeding means includes a tension roller which is freely movably fitted in said slot such that a paper portion unrolled from said roll of paper and extending between said feed rollers and said roll of paper is maintained in tension as said tension roller rides on said paper portion as guided by said slot when said bracket is in said closed position.

14. A roll paper handling device of claim 13 wherein said feeding means further includes a manually operable cutter as provided in said bracket downstream of said first feed roller with respect to the advancing direction of said paper portion.

* * * * *